(12) United States Patent
Kreibe et al.

(10) Patent No.: US 8,583,704 B2
(45) Date of Patent: *Nov. 12, 2013

(54) SYSTEMS AND METHODS FOR EFFICIENT DATA TRANSFER

(75) Inventors: Martin Kreibe, Wilmington, DE (US); Francis Simon, Malvern, PA (US)

(73) Assignee: SAP AG, Walldorf (DE)

( * ) Notice: Subject to any disclaimer, the term of this patent is extended or adjusted under 35 U.S.C. 154(b) by 131 days.

This patent is subject to a terminal disclaimer.

(21) Appl. No.: 13/274,169

(22) Filed: Oct. 14, 2011

(65) Prior Publication Data

US 2012/0059856 A1    Mar. 8, 2012

Related U.S. Application Data

(63) Continuation of application No. 12/243,324, filed on Oct. 1, 2008, now Pat. No. 8,065,341.

(51) Int. Cl.
*G06F 7/00* (2006.01)
*G06F 17/30* (2006.01)

(52) U.S. Cl.
USPC .......................................... 707/803; 707/809

(58) Field of Classification Search
USPC ........................................ 707/803, 809, 102
See application file for complete search history.

(56) References Cited

U.S. PATENT DOCUMENTS

| | | | |
|---|---|---|---|
| 5,980,096 A * | 11/1999 | Thalhammer-Reyero | 1/1 |
| 6,161,103 A | 12/2000 | Rauer et al. | |
| 6,591,272 B1 | 7/2003 | Williams | |
| 2004/0205473 A1 * | 10/2004 | Fisher et al. | 715/500 |
| 2006/0184561 A1 | 8/2006 | Terada | |
| 2006/0235837 A1 * | 10/2006 | Chong et al. | 707/4 |

* cited by examiner

*Primary Examiner* — Cam Troung
(74) *Attorney, Agent, or Firm* — Finnegan, Henderson, Farabow, Garrett & Dunner, L.L.P.

(57) ABSTRACT

A system and method for transferring data are provided. The method comprises: sending, from a receiving device, a data query to request data from a sending device; receiving, from the sending device, a data result model in response to the data query, the data result model including a table block; analyzing the data result model to regenerate the data for storage at the receiving device in accordance with the table block; and providing the regenerated data for storage at the receiving device.

17 Claims, 8 Drawing Sheets

501 Header
| 0x784D4949 | 0x01 | 0x0000 | 0x00 |
|---|---|---|---|
| Protocol Identifier | Protocol Version | Model Type | Model Version |

| 0x00000000 | 10000000-0000-0000-0000-000000000000 |
|---|---|
| Encoding Field | Message Identifier |

502 Properties

0x01

| | | | | |
|---|---|---|---|---|
| 0x01 | 0x00 | 2000-01-01T00:00:00 | | Standard Property |
| 0x01 | 0x01 | 2000-01-01T01:00:00 | | Standard Property |
| 0x02 | "User Property" | 0x0000000b | "Property Value" | Extended Property |
| 0x00 | | | | Termination |

503 Table

0x02  2

| "Column1" | 0x00000008 | 0x03 | | Column Definition |
|---|---|---|---|---|
| 0x01 | 0x02 | 0.0 | | Standard Metadata |
| 0x01 | 0x03 | 100.0 | | Standard Metadata |
| 0x01 | 0x00 | "The first column" | | Standard Metadata |
| 0x01 | 0x01 | "Col1" | | Standard Metadata |
| 0x02 | "Engineering Units" | 0x0000000b | "m/s" | Extended Metadata |
| 0x00 | | | | Column Definition Termination |
| "Column2" | 0x0000000b | 0x01 | | Column Definition |
| 0x01 | 0x00 | "The second column" | | Standard Metadata |
| 0x00 | | | | Column Definition Termination |

| Row Flag | NULL Locator | Column 1 Values | Column 2 Values | |
|---|---|---|---|---|
| 0x01 | | 2 {1.1, 2.2} | "Value 1" | Row with non-null values |
| 0x02 | B:00000010 | null | "Value 2" | Row with null values |
| 0x01 | | 3 {3.3, 4.4, 5.5} | "Value 3" | Row with non-null values |
| 0x00 | | | | Rowset Termination |

504 Final Status

| 0x00 | | | | Final Status Block |
|---|---|---|---|---|
| | 0x01 | 0x01 | "This is a message." | Message |
| | Severity | Message Value | | |
| | 0x00 | 0x00 | | Final Status Block Termination |
| | | Status | | |

FIG. 5

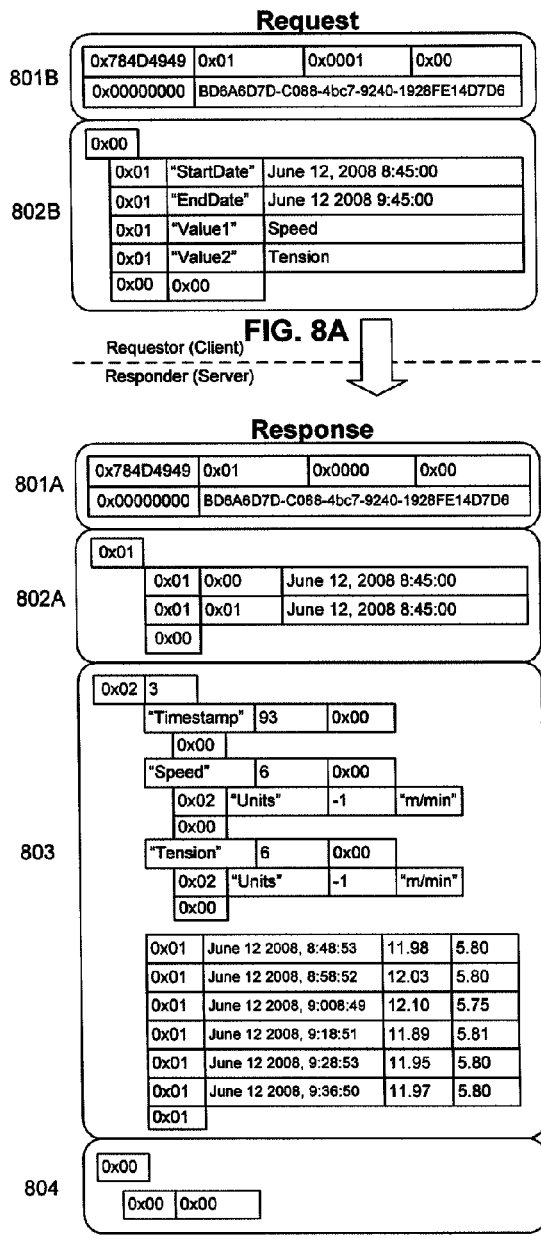
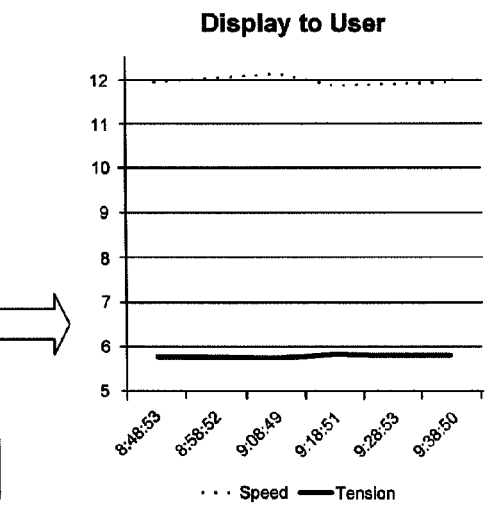
FIG. 8A
FIG. 8B
FIG. 8C
FIG. 8D

SYSTEMS AND METHODS FOR EFFICIENT DATA TRANSFER

This application is a continuation of U.S. application Ser. No. 12/243,324, filed Oct. 1, 2008, now U.S. Pat. No. 8,065,341, which is incorporated by reference in its entirety.

BACKGROUND

I. Technical Field

The present invention generally relates to the field of data processing and to systems and methods for enabling the transfer of data. More particularly, and without limitation, the invention relates to systems and methods for transferring data between, for example, a server and a client.

II. Background Information

Various techniques and methods are known for transferring data from point-to-point. The data is typically represented by an electro-magnetic signal that is transmitted over a wired or wireless communication channel. The communication channel may be part of a network that connects the devices or points between which the data is transferred.

When transferring data point-to-point, several considerations must be addressed. One such consideration is the format of the data. Another consideration, particularly when the bandwidth of the communication channel is limited, is the size of the data to be transferred. The format of the data is a consideration because the data may need to be transferred according to a specific data format anticipated or required by the receiving device (e.g., a client device). The same is true if data also needs to be communicated back to the sending device (e.g., a server). In addition to ensuring data compatibility and/or interoperability, the size of the data should be minimized to permit maximum efficiency in the data transfer rate. Conventional techniques for addressing the size of the data include compression and coding.

In certain systems and applications, the amount of data to be transferred may be substantial. For example, in certain environments, large volumes of business, financial, and/or manufacturing data may need to be transferred on a real-time, daily or otherwise frequent basis. In addition to addressing the size of the data to be transferred, the format of the data is often a critical consideration because the devices communicating or sharing the transferred data may utilize disparate data formats and/or protocols.

In the area of manufacturing, a wide variety of devices may share and transfer data. Examples of such devices include enterprise resource planning (ERP) components and plant floor systems. In such environments, real-time visibility into manufacturing exceptions and performance issues is required, so that manufacturers and their suppliers better respond to changes, such as increases or decreases in demand. As a result, it may be necessary to transfer historical manufacturing data and/or other data types in an efficient, reliable, and flexible manner.

Conventional protocols and other techniques are known for transferring data, such as historical manufacturing data. One such example is the Lighthammer Illuminator Streaming to Applet (LISA) data protocol. The LISA protocol is a data protocol that can be used by, for instance, SAP xApp Manufacturing Integration and Intelligence (xMII), xMII Applets, and xMII Universal Data Servers (UDSs). The LISA protocol, as well as other know data protocols for transferring data, possesses a number of disadvantages, such as those described below.

Conventional data protocols fail to transfer data in an efficient manner. For example, with the LISA protocol, it is possible to transfer Null data, but the LISA protocol overloads a real value to do so. Compatibility, forwards and backwards, is also a common disadvantage with conventional data protocols, as many fail to include a mechanism to update or provide compatibility among versions. Other drawbacks with known data protocols include limited extensibility, such that message and column metadata can not be transferred without prior knowledge, and/or limited flexibility, which results in some fields being required by the protocol even though they do not apply to the data transferred.

Furthermore, with conventional data protocols, it is often necessary to know if a data set has an error before the data transfer begins in order to handle the error. This approach severely limits the error-handling ability of the data protocol, reducing the efficiency and accuracy of the data transfer.

In view of the foregoing, there is a need for improved systems and methods for transferring data. Among other things, there is a demand for a more robust data protocol to enable the efficient and reliable transfer of data. There is also a need for improved systems and methods that overcome other disadvantages with conventional data protocols, such as extensibility and forward/backward compatibility.

SUMMARY

Embodiments of the present invention include systems and methods for transferring data. As further disclosed herein, embodiments of the invention may overcome one or more of the disadvantages associated with conventional data transfer protocols, including in the areas of efficiency, reliability, and compatibility.

According to one embodiment, a method is provided for transferring data from a sending device (e.g., a server) to a receiving device (e.g., a client). The method may include sending, from the receiving device, a data query to request data from the sending device and receiving, from the sending device, a data result model in response to the data query. The data result model may include a table block. The method may also include analyzing the data result model to regenerate the data for storage at the receiving device, wherein analyzing the data result model may include reading at least one column definition and at least one data row from the table block, the data row including a row flag, a null location list, and a row payload field including the non-null data to be transferred to the receiving device. The method may further include processing each mapped data row to provide the regenerated data for storage at the receiving device.

In accordance with one aspect of the method, analyzing the data result model may further comprise determining the number of columns in the table block from the column definition. Analyzing the data result model may also comprise analyzing the row flag to determine whether the data row includes null values, and, when the row flag indicates the presence of null values, further analyzing the null location list to determine location information for non-null and null values.

In accordance with another aspect of the method, analyzing the result model may further comprise creating at least one mapped data row by sequentially inserting the non-null data from the row payload field at non-null locations and inserting a null value at each null location determined in the analyzing step.

Embodiments of the invention also relate to systems for transferring data. In accordance with one embodiment, a system is provided. The system may include a receiving device that initiates a data transfer by sending a data query to request data from a sending device, and that receives, in response, a data result model from the sending device, the data result model including a table block. The receiving device may analyze the data result model to regenerate the data for storage at the receiving device.

In accordance with one aspect of the system, the receiving device may include means for analyzing the data result model. The analyzing means may comprise means for reading at least one column definition and at least one data row from the table block, the data row including a row flag, a null location list, and a row payload field including non-null data. The analyzing means may also include means for determining the number of columns in the table block from the column definition and means for determining whether the data row includes null values from the row flag and, when the row flag indicates the presence of null values, further analyzing the null location list to determine location information for non-null and null values.

According to another embodiment, a computer-readable storage medium is provided that comprises instructions, which when executed on a processor, cause the processor to perform a method for transferring data from a sending device (e.g., a server) to a receiving device (e.g., a client). The method may include sending, from the receiving device, a data query to request data from the sending device and receiving, from the sending device, a data result model in response to the data query. The data result model may include a table block. The method may also include analyzing the data result model to regenerate the data for storage at the receiving device, wherein analyzing the data result model may include reading at least one column definition and at least one data row from the table block, the data row including a row flag, a null location list, and a row payload field including non-null data to be transferred to the receiving device. The method may further include processing each mapped data row to provide the regenerated data for storage at the receiving device.

In accordance with one aspect of the method, analyzing the data result model may further comprise determining the number of columns in the table block from the column definition. Analyzing the data result model may also comprise analyzing the row flag to determine whether the data row includes null values, and, when the row flag indicates the presence of null values, further analyzing the null location list to determine location information for non-null and null values.

In accordance with another aspect of the method, analyzing the result model may further comprise creating a mapped data row by sequentially inserting the non-null data from the row payload field data at non-null locations and inserting a null value at each null location determined from the null location list.

BRIEF DESCRIPTION OF THE DRAWINGS

The accompanying drawings, which are incorporated in and constitute a part of this disclosure, illustrate various embodiments and aspects of the present invention. In the drawings:

FIG. 5 is an exemplary representation of a data result model transferred from a sending device to a receiving device;

FIGS. 8A-8D is a diagram of a data transfer example, consistent with aspects of the present invention.

DETAILED DESCRIPTION

Figure 1:
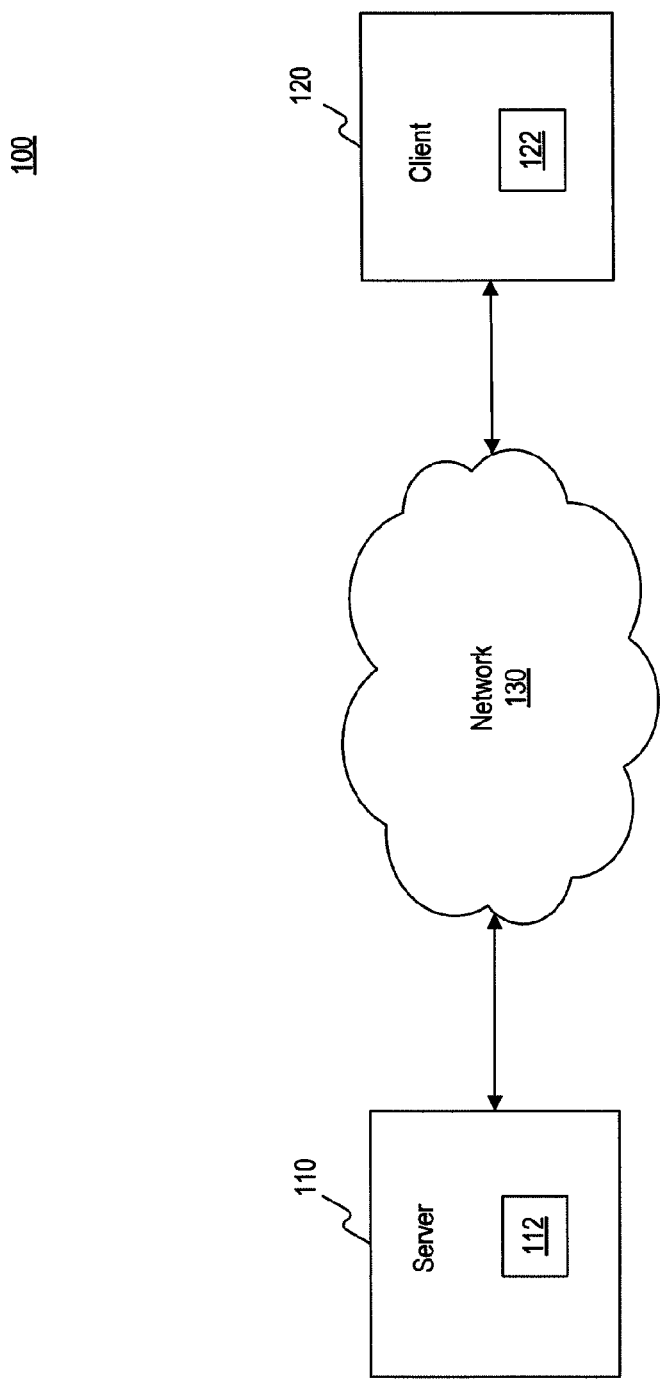
FIG. 1 is an example of a system for transferring data from a sending device to a receiving device, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 is an example of a system for transferring data, consistent with a disclosed embodiment. In the exemplary system 100 of FIG. 1, the transfer of data is between a server 110 and a client 120. However, the sending device is not limited to a server, and the receiving device is not limited to a client. By way of a non-limiting example, the data that is transferred may be of any form or order, such as a tuple of any specific length. In one embodiment, a tuple may include a timestamp as well as another value or values. The receiving and sending devices may be any type of device or component. By way of non-limiting examples, the receiving and sending devices may be two servers, a client and a server, an applet and a server, or a Universal Data Connector (UDC) and a server, etc. Further, as will be appreciated by persons skilled in the art, the arrangement in FIG. 1 is exemplary and any type and/or number of sending and receiving devices may be utilized to implement embodiments of the present invention.

As shown in system 100 of FIG. 1, server 110 and client 120 are connected via a network 130. Although a single server and a single client are depicted in FIG. 1, any number of these devices may be provided in system 100. Furthermore, devices other than server 110 and client 120 may be implemented and the functions provided by one or more devices of system 100 may be combined. For example, the functionality of any one or more devices of system 100 may be implemented by any appropriate computing environment.

In the exemplary embodiment of FIG. 1, network 130 provides communications between the various devices in system 100, such as server 110 and client 120. In addition, server 110 may access legacy systems (not shown) via network 130, or may directly access legacy systems, databases, or other network applications. Network 130 may be a shared, public, or private network, may encompass a wide area or local area, and may be implemented through any suitable combination of wired and/or wireless communication networks. Furthermore, network 130 may comprise a local area network (LAN), a wide area network (WAN), an intranet, or the Internet.

Server 110 may comprise a computer (e.g., a personal computer, network computer, server, or mainframe computer) having one or more processors (not shown) that may be selectively activated or reconfigured by a computer program. Furthermore, server 110 may distribute data for parallel processing by one or more additional servers (not shown). Server 110 may also be implemented in a distributed network. Alternatively, server 110 may be specially constructed for carrying-out methods consistent with the disclosed embodiments herein.

Server 110 may include a memory 112 for storing program modules that, when executed by a processor (not shown), perform one or more processes such as one or more processes that receive and analyze a data query from client 120 and that generate and transfer a data result model to client 120. Memory 112 may be one or more memory devices that store data as well as software and may also comprise, for example, one or more of RAM, ROM, magnetic storage, or optical storage.

Client 120 may include a memory 122 for storing program modules that, when executed by a processor (not shown), perform one or more processes such as one or more processes that generate and send a data query and that analyze a data result model received from server 110 to regenerate data for storage at client 120. Memory 122 may be one or more memory devices that store data as well as software and may also comprise, for example, one or more of RAM, ROM, magnetic storage, or optical storage. Client 120 may be any type of device for communicating with server 110 over network 130. For example, client 120 may be a personal computer, handheld device, or any other appropriate computing platform or device capable of exchanging data through network 130.

The program modules stored in memory 112 and memory 122 may be implemented using any form of programming instructions for execution by a processor (not shown). For example, the program modules may be implemented using applets, plug-ins, and/or any other form of software components.

Figure 2:
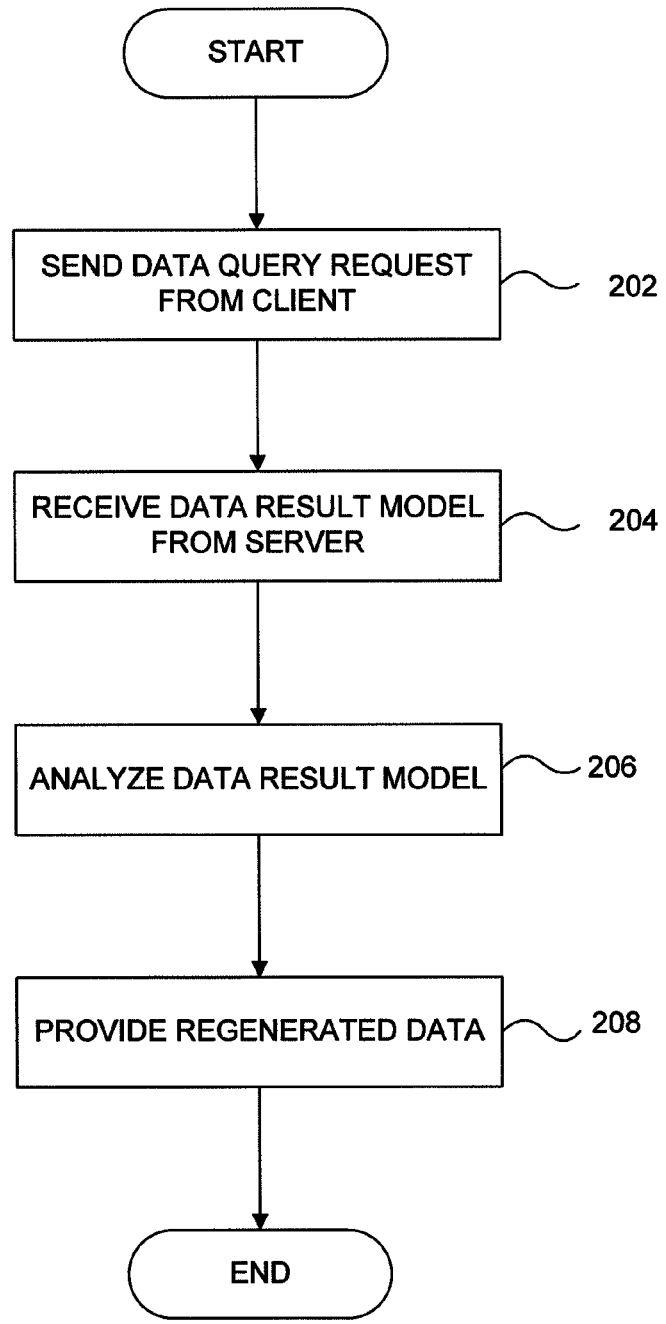
FIG. 2 is a flow diagram of an exemplary method for transferring data, consistent with a disclosed embodiment.

FIG. 2 is a flow diagram of an exemplary method for transferring data, consistent with a disclosed embodiment. The method described in connection with FIG. 2 may be implemented by, for example, program modules or instructions stored in memory 112 of server 110, as well as program modules or instructions stored in memory 122 of client 120.

At the start, in step 202, client 120 may send server 110 a data query to request data from the server. In one embodiment, the data query is in the form of a query model including a query block. The query block may begin with a block identifier, comprising a single byte, followed by a series of query parameter definitions. Examples of query parameter definitions include, for example, a date range for the result data, the maximum returned rows in the result set, and the name of the data to be retrieved. The query parameter definitions may be followed by a parameter termination that identifies the end of the data query transmission. In one embodiment, a parameter termination field set is used to end the sequence of parameters and starts with a single byte. Additionally, after the single byte a status field may be provided that indicates whether the data query has succeeded or failed. An exemplary embodiment of a data query is described in greater detail below in connection with FIG. 4.

Next, in step 204, client 120 receives a data result model from server 110. The data result model may communicate via network 130 and generated by server 110 in response to the data query model. The data result model may include a table block to transfer information related to the requested data. The table block may include at least one column definition and at least one data row, the data row including a row flag, a null location list, and a row payload field, wherein the row payload field contains non-null data transferred from server 110 to client 120. An exemplary embodiment of the data result model is described in greater detail below in connection with FIG. 5.

In step 206, client 120 analyzes the data result model received from server 110 to regenerate the data for storage at the client. Analyzing the data result model may include reading each column definition and data row from the table block, and determining the number of columns in the table block from the column definition. Further, analyzing the data result model may include analyzing the row flag for each data row to determine whether the data row includes null values and, when the row flag indicates the presence of null values, further analyzing the null location list to determine location information for the null values. An exemplary embodiment of the analyzing process is described in greater detail below with reference to FIG. 3.

To complete the process, in step 208, the mapped data rows may be processed to provide the regenerated data for storage or output at client 120. By way of a non-limiting examples, client 120 may display the data in a grid or graphical format, analyze the data for statistical purposes, or feed the data into another system for processing.

Figure 3:
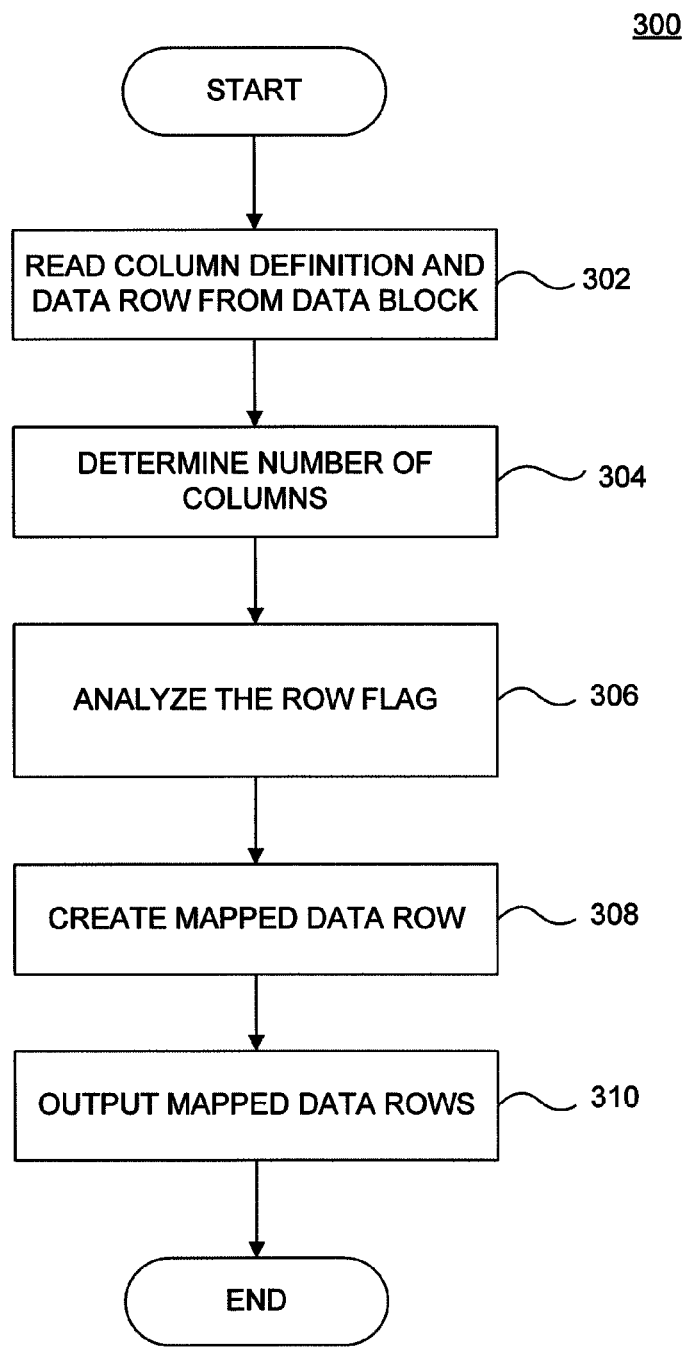
FIG. 3 is a flow diagram of an exemplary method of analyzing a data result model, consistent with a disclosed embodiment.

FIG. 3 is a flow diagram of an exemplary method for analyzing a data result model (see process 206 of FIG. 2), consistent with a disclosed embodiment. The method described in connection with FIG. 3 may be implemented by, for example, program modules stored in memory 122 of client 120.

At the start of the method, client 120 reads at least one column definition and at least one data row from the table block in the received data result model. As indicated above, the data row may include a row flag, a null location list, and a row payload field. The row payload field may contain the non-null data to be transferred from server 110 to client 120. An exemplary table block is described in more detail in the description of element 503 in FIG. 5 below.

In step 304, client 120 may determine the number of columns in the table block. The number of columns may be determined from the column definition in the table block. For purposes of illustration, the determination process is described in more detail in the description below of element 501 for the example of FIG. 5.

In step 306, client 120 may also analyze the row flag in the table block to determine whether the data row includes null values. In one embodiment, when the row flag indicates the presence of null values, client 120 may further analyze the null location list to determine location information for the null values. For purposes of illustration, this process is described in more detail in the description below for the exemplary embodiment of FIG. 5.

Figure 6:
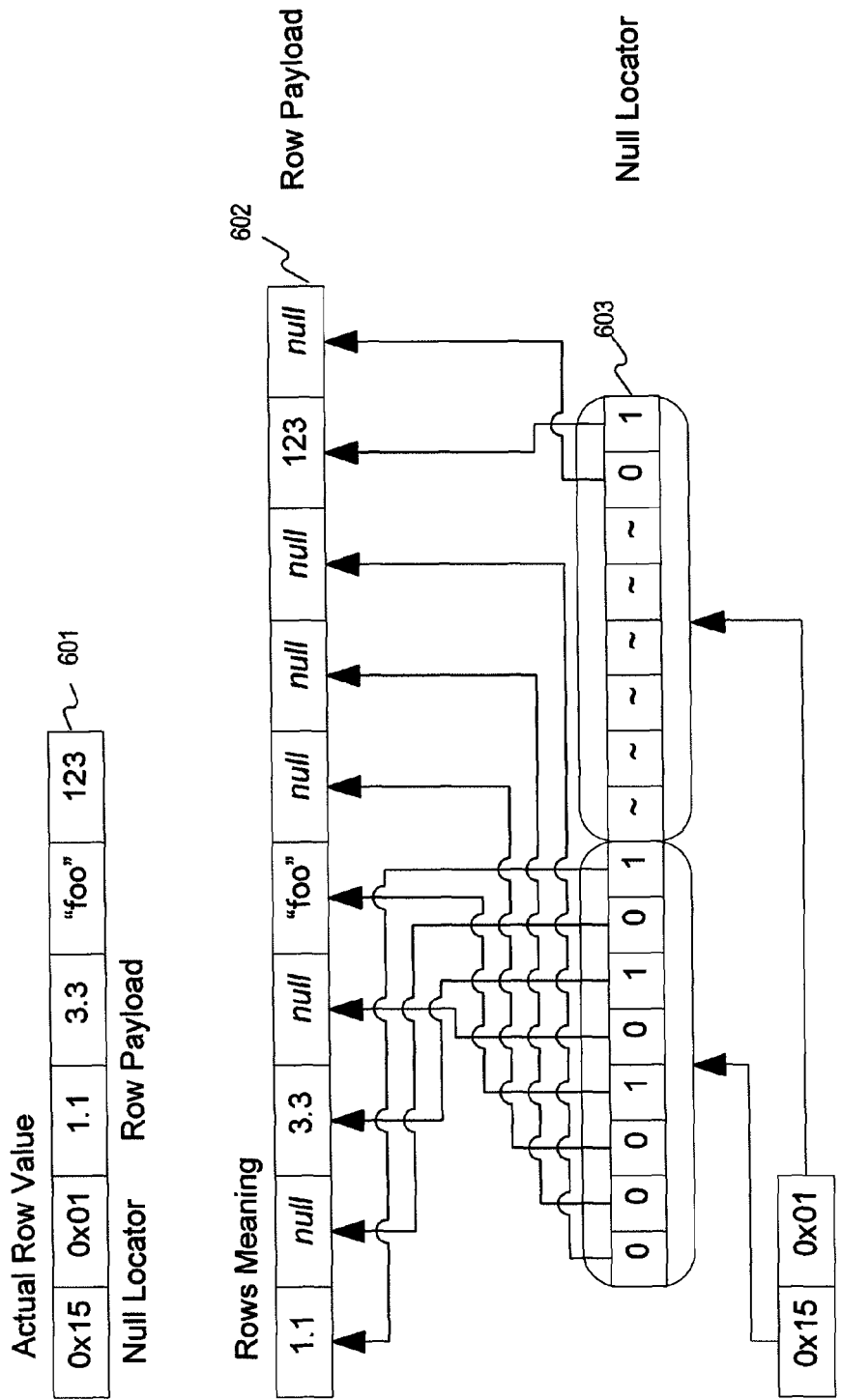
FIG. 6 is a diagram illustrating an example of creating a mapped data row, consistent with a disclosed embodiment.

In step 308, client 120 creates a mapped data row by sequentially mapping the row payload (i.e., the non-null data) to non-null locations indicated in the null location list. The number of column values mapped to the null location list may be determined by the column definition field in the table block. The column definition field may describe the number of columns included in the mapped data row. In other words, the number of columns is equal to the combined number of null and non-null values in each mapped data row. The column definition field is described in more detail in the description of table block 503 in FIG. 5. The mapping step may include inserting the payload field data at the locations the null location list indicates the presence of non-null data and inserting a null value for each location that the null location list indicates the presence of null data. The example of FIG. 6 illustrates this mapping step and is described in more detail below. The form the mapped data output takes may be driven by the data process itself. Data rows may be processed according to the function of the data process. By way of example, the data may be returned in table format when a process requires data values displayed in a grid. By way of another example, data values may be plotted on a graph when a process requires the plotting of points at the output device.

Figure 4:
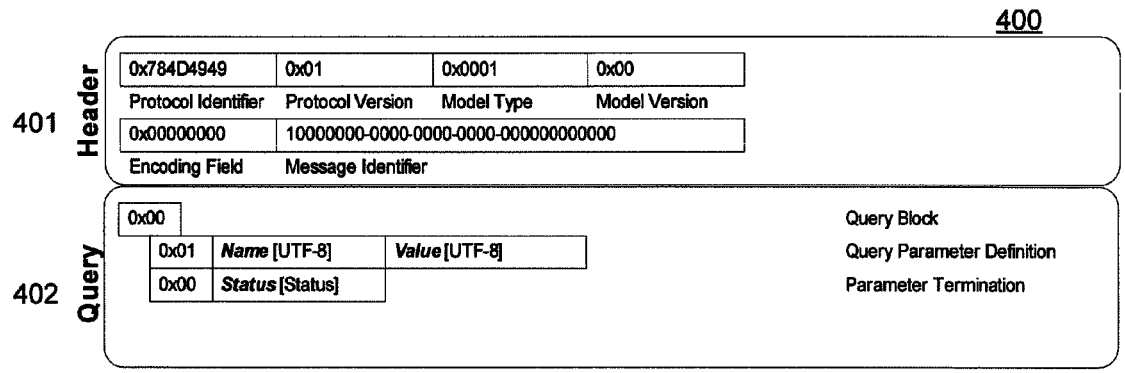
FIG. 4 is an exemplary representation of a data query for requesting data from a sending device, consistent with a disclosed embodiment.

FIG. 4 is an exemplary representation of a data query to request data from a sending device, consistent with a disclosed embodiment. In the example of FIG. 4, element 401 illustrates a header block in binary data representation. The header may be the first section of the data blocks that constitute the data query. The header may describe the data protocol of the data transfer and include a message in general, but may not contain any real data.

The first four bytes in the header block may comprise a protocol identifier field. The protocol identifier field may allow a protocol decoder at the sending device to distinguish between this protocol and any other protocols, without further examination of the source of the data protocol.

The second field in the header of element 401 is a protocol version field. The protocol version field may be a single byte in length. Although the protocol version may change during processing of transferred data, it is generally expected to change only if the header changes or a new encoding model is defined.

In one embodiment, for each modification of the protocol, the protocol version field may be incremented by a single value. This allows for flexibility in the protocol. In addition, the protocol version field may be incremented only when the previous versions do not support the specific types of data required.

Referring again to element 401, a model type field may also be included in the header block. The model type field may be used to denote the underlying format of the data. In one embodiment, two types of data may be supported; namely, a data model result and a data query. The model type field may be of any predetermined length, such as two bytes in length.

In the example of FIG. 4, element 402 illustrates a query block in binary data representation. The query block may be the second block in the data query following the header block. The query block may begin with a query block identifier field. The query block identifier field may comprise a single byte.

Referring again to element 402, a query parameter definition field may also be included in the query block. The query parameter definition field may follow the query block definition in the query block field. Examples of name field and value field parameters may include limiting result sizes, such as, "Maximum Rows", or "Maximum Size." In another embodiment of the invention, the name field and value field parameters may include the inclusion of column metadata, such as, "Include Standard Metadata", or "Include Units." In yet another embodiment of the invention, the name field and value field parameters may include query property overriding instructions, such as, "Include Debug messages", or "Ignore Errors". In a further embodiment of the invention, the name field and value field parameters may include inline data manipulation commands, such as "Override Null Values." Referring again to element 402, a parameter termination field may also be included in the query block. The parameter termination field may follow the query parameter definition field. The parameter termination field may identify the end of the data query transmission. In one embodiment, a parameter termination field may be used to end the sequence of parameters and starts with a single byte. After the single byte a status field may be provided that indicates whether the data query has succeeded or failed.

Embodiments of the invention may be implemented to support the transfer of data of different value types. By way of non-limiting examples, Table 1 below lists the different value types for transferred data.

TABLE 1

| Value | SQL Type | Type Description | Size in Bytes |
|---|---|---|---|
| −7 | BIT | A single bit value. Range: 0, 1 | 1 Byte |
| −6 | TINYINT | A very small integer. Range: −128 to 127 | 1 Byte |
| 5 | SMALLINT | A small integer. Range: −32768 to 32767 | 2 Bytes |
| 4 | INTEGER | An integer. Range: −2,147,483,648 to 2,147,483,647 | 4 Bytes |
| −5 | BIGINT | A large integer. Range: −9,223,372,036,854,775,808 to 9,223,372,036,854,775,807 | 8 Bytes |
| 6 | FLOAT | A float point. Range: −1.7E308 to 1.7E308 | 8 Bytes Float Points |
| 7 | REAL | A float point. Range: −3.4E38 to 3.4E38 | 4 Bytes Float Points |
| 8 | DOUBLE | A large float point value. Range: −1.7E308 to 1.7E308 | 8 Bytes Float Points |
| 1 | CHAR | A UTF-8 encoded string of length up to 254. Structure: 1 Byte length + n characters. | 1 Byte + n UTF-8 sequences |
| 12 | VARCHAR | A UTF-8 encoded string of length up to 65536. Structure: 2 Byte length + n characters. | 2 Byte + n UTF-8 sequences |
| −1 | LONGVARCHAR | A UTF-8 encoded string of length up to 4,294,967,296. Structure: 4 Byte length + n characters. | 4 Bytes + n UTF-8 sequences |
| 91 | DATE | A date time structure represented by the number of milliseconds since Jan. 1, 1970 UTC. | 8 Bytes |
| 92 | TIME | A date time structure represented by the number of milliseconds since Jan. 1, 1970 UTC. | 8 Bytes |
| 93 | TIMESTAMP | A date time structure represented by the number of milliseconds since Jan. 1, 1970 UTC. | 8 Bytes |
| 16 | BOOLEAN | A Boolean value. Range: false, true | 1 Byte |

Data of any of the value types in Table 1 may be included in, for example, tuples transferred between server 110 and client 120. The first column of Table 1 lists the code value of each data type which may be included, for instance, in the block identifier field described in element 402 of FIG. 4 above. In one embodiment, the code values are represented in hexadecimal form in the data query. Table 1 also includes the corresponding SQL-type for each value type, as well as, descriptions of the types of data. The last column in Table 1 provides examples of the size restrictions that may be set for each value type and utilized for transferring data.

FIG. 5 is an exemplary representation of a data result model which may be used for the transfer of data from the sending device to the receiving device, consistent with a disclosed embodiment.

In the example of FIG. 5, element 501 illustrates a header block in binary data representation. The header may be the first section of the data blocks. The header may describe the data protocol of the data transfer and include a message in general, but may not contain any real data.

The first four bytes in the header block may comprise a protocol identifier field. The protocol identifier field may allow a protocol decoder in the receiving device to distinguish between this protocol and any other protocols, without further examination of the source of the data protocol.

The second field in the header of element 501 is a protocol version field. The protocol version field may be single byte in length. Although the protocol version may change during processing of the data stream, it is generally expected to change only if the header changes or a new encoding model is defined.

In one embodiment, for each modification of the protocol, the protocol version field may be incremented by a single value. This allows for flexibility in the protocol. In addition, the protocol version field may be incremented when the previous versions do not support the specific types of data required. The version incrementing may also occur when occurrences such as an unsupported data type or a structural change in the protocol are detected.

Referring again to element 501, a model type field may also be included in the header block. The model type field may be used to denote the underlying format of the data. In one embodiment, two types of data may be supported; namely, a data model result and a data query. The model type field may be of any predetermined length, such as two bytes in length.

Referring again to element 501, a model versioning field may also be included in the header block. The model versioning field may be used to accommodate a model change. The model version field may indicate a new model version was introduced separately and independently from the protocol version.

Referring again to element 501, an encoding field may also be included in the header block. The encoding field may follow the model version field. The encoding field may be of double word length. The encoding field may be used to describe the type of encoding implemented by the protocol. Further embodiments of the invention may use this field to implement other encoding models, including security and compression strategies.

Referring again to element 501, a message identifier field may also be included in the header block. The message identifier field may occupy the next 16 bytes after the encoding field. The message identifier field may hold a GUID. A GUID is a special data type that may be generated to create a unique ID over space and time. A GUID may be used by the message identifier field to uniquely mark a message to facilitate cross reference of the message over disparate systems. The GUID may be generated by the requesting entry if the model type is a synchronous query or an asynchronous query. The GUID may be generated by the requesting entry if the message type is a synchronous query or an asynchronous query. In one embodiment, elements 502, 503, and 504 together comprise the data result model. The data result model may follow the header block, element 501. The data result model may comprise a properties block illustrated by element 502 of FIG. 5, a table block illustrated by element 503 of FIG. 5, and a final status block illustrated by element 504 of FIG. 5. All of these blocks may start with a single byte that may denote the block type. Elements 502, 503, and 504 may be decoded by client 120 when the model type field and the model version field are set appropriately by header block 501.

Referring again to element 502, a standard property field may be provided in the properties block. The standard properties field may have a property identifier flag value, followed by a single byte property type and a property value data member. The property field may include the start date property and the end date property. The start date property may indicate the earliest time bound for the data. The value payload of the start date property may be a time stamp. The end date property may indicate the latest bound the data may have. The value payload of the end date property may also be a time stamp.

Referring again to element 502, an extended property field may be provided in the properties block. The extended property may have a property identifier flag value. The property identifier flag value may be followed by a UTF-8 (8-bit Unicode Transformation Format) encoded string, an SQL-type value, and a property value. UTF-8 is an 8-bit UCS (Universal Character Set) used for encoding variable length unicode strings. The property value type may be specified by the SQL-type preceding the property value type.

Referring again to element 502, a property termination field may be provided in the properties block. The property termination may signal the end of the properties block.

In the example of FIG. 5, element 503 illustrates a table block in binary data representation. There can be zero to any number of table blocks. The table blocks may follow the properties block. Like the header block and the properties block, each property block may begin with a block identification flag value. The table blocks may have a table-like structure with columns and rows. The table block header may describe the real data to be transferred, or the "payload" of the data blocks.

Referring again to element 503, a column definition field may be provided in the table block. The column definition may comprise the first 4 bytes in the table block after the block identification. The column definition may be used to describe the number of columns in the table block. The column definition may also be used to determine the order and types of values in the data rows. If the column definition defines the number of columns as zero, then the table may be considered NULL.

Referring again to element 503, a metadata field may be provided in the table block. A metadata field may describe the type of data in the columns. The metadata field may start with a single byte metadata flag and may be followed by a metadata type. Metadata type may include a description type. A description type may include a human understandable description of what the data point may do or indicates. A description type may be a minimum type that may store the columns minimum value as a double (8 byte float). This meta-data type may be used on any column. For instance, a string column may have a max value, which may indicate the maximum size the string can occupy. The metadata type may also be a maximum type, which stores the columns maximum value in the value as a double (8 byte float). This metadata type may also be used on any numerical column.

Referring again to element 503, an extended metadata field may be provided in the table block. The extended metadata field begins with a metadata flag that may be used to describe non-standard metadata fields. The extended metadata field may have a UTF-8 name followed by a SQL-type and value. The SQL-type may be used to describe the values type.

Referring again to element 503, a column definition termination field may be provided in the table block. The column definition termination field may be the final column definition field. It may be assumed that the next column or data will start immediately after this field.

Referring again to element 503, a data row may be provided in the table block. The data rows may contain the payload data being transferred from server 110 to client 120. All data rows may start with a single byte row flag followed by the row payload.

A data row may contain null data or may contain no null data. A data row that does not contain null data may begin with a row flag. The row flag may then be followed by the column values. The column value types may described by the column metadata as discussed above. The row definition with null data is described in more detail in the description of FIG. 6 that follows. In addition, the mapping of the non-null data rows is described below with reference to the example of FIG. 6.

Referring again to element 503, a row termination field may be provided in the table block. The data termination is the last byte of data in the row set. Once the data termination field is set, the table block may be terminated.

In the example of FIG. 5, element 504 illustrates a final status block in binary data representation. The final status block may be used to send messages to the receiving device and to complete the body of the message. There may be one and only one final status block in a message. The final status block can have any number of messages and may end with a single termination.

Referring again to element 504, a user message field may be provided in the final status block. The user message in the final status block may begin with a single byte flag. The byte flag may be followed by a single byte severity value and a UTF-8 value. The severity value may describe message priority. The severity may have no connection to order of the message. Severity values in the user message may include a debug message. A debug type of message may be used in development environments. A message may also be an informational message. This type of message may convey information. An example of such a message may be "Command Executed Successfully." A warning message may be generated by a successful query when some aspect of the query may have failed. A message may also be an error message indicating a query could not be executed or failed mid stream.

Referring again to element 504, a final status block termination field may be provided in the final status block. The final status block termination field may indicate the end of the final status block. This field may also indicate the end of the data in the data transfer to the receiving device.

FIG. 6 is a diagram illustrating an example of creating a mapped data row (see step 308 of FIG. 3), consistent with a disclosed embodiment.

In the example of FIG. 6, element 601 refers to an actual data row, as discussed in relation to element 503 of FIG. 5. The data row may include null location fields and data row payload fields. The null location field may include a null location list. The null location list may use a number of bits indicating the number of columns in table block 503. Each bit of the null location list may describe a column value existing, non-null, or the bit in the null location list may describe the column value does not exist, i.e., it is null. In an exemplary embodiment, the bits value may be set to "1" when a column value exists, and may be set to "0" when the column value does not exist. The null location field may be followed by the data row payload field. The data row payload field may contain the data row payload. The data row payload may be the non-null data that is being transferred from sending device 110 to receiving device 120.

In the example of FIG. 6, element 602 refers to a mapped data row, as discussed in relation to element 308 of FIG. 3. In addition, element 603 refers to a bit-wise expanded, null location list from element 601 in FIG. 6. The mapping of data rows, such as in step 308 of FIG. 3, may include mapping each bit value of the null location list to mapped data row columns. The mapping may further include inserting the payload field data at the column the null location list indicates the presence of non-null data and inserting a null value when the null location list indicates the presence of null data.

Figure 7:
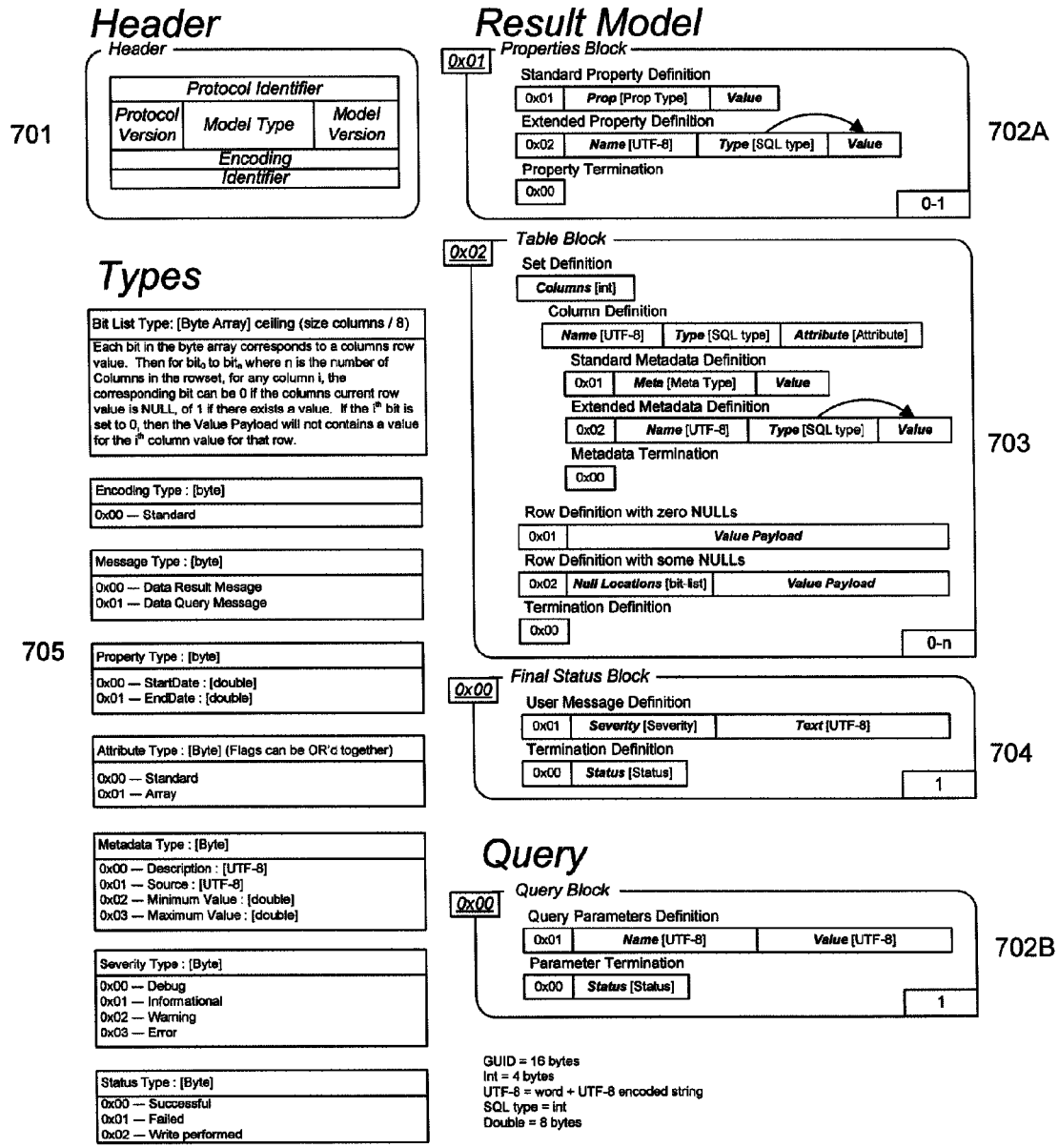
FIG. 7 is an exemplary embodiment of a data query and a data result model, consistent with aspects of the present invention.

FIG. 7 is an exemplary embodiment 700 of the data query and data result model, consistent with aspects of the present invention. FIG. 7 illustrates detailed examples of the data blocks that may be used with the data query and the data result model. In particular, a header block 701 is illustrated in FIG. 7 which may be used with the data query (702B) and the data result model (702A, 703, 704). In particular, with respect to the data query, header block 701 may be combined with a query block 702B. With respect to the data result model, several data blocks may be combined with header block 701, including a properties block 702A, a table block 703, and a final status block 704. In addition, FIG. 7 provides examples of the various field types (see reference character 705) for the data blocks 701, 702A, 702B, 703, and 704 of the data query and data result model.

In the example of FIG. 7, header block 701 contains data fields similar to those in header blocks 401 and 501 of the embodiments of FIGS. 4 and 5, respectively. The "Model Type" field may vary to indicate a data query or a data result model. For example, the model type may be "0x0001" for a data query and "0x0000" for a data result model.

With respect to the data query, query block 702B may be structured with data fields similar to those described above for query block 402 in FIG. 4. Similarly, the result model in FIG. 7 includes data blocks 702A (properties block), 703 (table block), and 704 (final status block) that may be implemented with similar data fields to the properties block 502, table block 503, and final status block 504 in FIG. 5.

Referring now to FIGS. 8A-8D, a data transfer example is provided, consistent with aspects of the invention. Generally, in this example, client 120 requests data from server 110 to display a graph of specific data values. The data request from client 120 is illustrated in FIG. 8A. Server 110 provides a data result model, illustrated in FIG. 8B, based on values stored in a database, as shown in FIG. 8C. As a result of the data transfer and transformation, client 120 displays a graph to the user based on the transferred data, as shown in FIG. 8D.

As indicated above, the data query for this example is illustrated by FIG. 8A. The fields in the data query are similar to the exemplary embodiments of FIGS. 4 and 7. The model type field in header 801B indicates that the data block is a data query. The data query field 802B describes the data being requested. In this example, the data query field includes a request for "Speed" and "Tension" values available between Jun. 12, 2008, 8:45:00 and Jun. 12, 2008, 9:45:00. In response to the data query, server 110 sends a data result model to client 120. The data result model is illustrated in FIG. 8B. The fields in this data result model are similar to the exemplary embodiments of FIGS. 5 and 7. The model type field in header 801A indicates a data result model. The table block 803 of the data result model includes the requested data retrieved from the database (FIG. 8C). After the data is transferred and transformed, client 120 may render the data into a graph or other display, as illustrated in FIG. 8D. As needed, client 120 may also perform analytics or other operations on the retrieved data to assist in another process, etc.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, these aspects can also be stored on other types of computer readable media, such as secondary storage devices, for example, hard disks, floppy disks, CD ROM, or other forms of RAM or ROM.

Computer programs based on the written description and methods of the present invention are within the skill of an experienced developer. The various programs or program modules can be created using any of the known techniques or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure.

The elements recited in the claims are to be interpreted broadly based on the language employed in the claims and not limited to examples described in the present specification or during the prosecution of the application, which examples are to be construed as non-exclusive. Further, the steps of the disclosed routines may be modified in any manner, including by reordering steps and/or inserting or deleting steps, without departing from the principles and aspects of the invention.

It is intended, therefore, that the specification and examples be considered as exemplary only, with a true scope and spirit of the invention being indicated by the following claims and their full scope of equivalents.

What is claimed is:

1. A method for transferring data, the method comprising:
sending, from a receiving device, a data query to request data from a sending device;
receiving, from the sending device, a data result model in response to the data query, the data result model including a table block;
analyzing the data result model to regenerate the data for storage at the receiving device, wherein the analyzing of the data result model comprises:
reading at least one column definition and at least one data row from the table block, the data row including a row flag, a null location list, and a row payload field including non-null data to be transferred to the receiving device;
determining the number of columns in the table block from the column definition;
analyzing the row flag to determine whether the data row includes null values and, when the row flag indicates a presence of the null values, further analyzing the null location list to determine location information for the non-null data and the null values; and
creating at least one mapped data row by sequentially inserting the non-null data from the row payload field at non-null locations and inserting the null values at null locations determined in the analyzing of the row flag, the number of columns in the table block being equal to the combined number of the null values and the non-null data in the at least one mapped data row; and
processing the at least one mapped data row to provide the regenerated data for storage at the receiving device.

2. The method of claim 1, wherein the number of columns in the table block is expandable to any number.

3. The method of claim 1, wherein the column definition includes predetermined metadata fields and extended metadata fields.

4. The method of claim 1, wherein the data result model further includes a final status block after the table block, and wherein the method further comprises:
determining based on the final status block whether the table block received by the receiving device is complete.

5. The method of claim 4, wherein determining whether the table block received by the receiving device is complete further comprises reading a user message in the final status block including a severity flag and a message in the final status block describing that the table block is complete.

6. The method of claim 1, wherein the receiving device is a universal data connector.

7. The method of claim 1, wherein the receiving device comprises an applet.

8. A system for transferring data from a sending device to a receiving device, the sending device providing a data result model in response to a data query from the receiving device, the data result model including a table block, wherein the system comprising:
a processor; and
a memory for storing program instructions which, when executed, cause the receiving device to:
analyze the data result model to regenerate data for storage at the receiving device;
read at least one column definition and at least one data row from the table block, the data row including a row flag, a null location list, and a row payload field including non-null data to be transferred to the receiving device;
determine the number of columns in the table block from the column definition;
analyze the row flag to determine whether the data row includes null values and, when the row flag indicates a presence of the null values, further analyze the null location list to determine location information for the non-null data and the null values;
create at least one mapped data row by sequentially inserting the non-null data from the row payload field at non-null locations and inserting the null values at null locations determined from the null location list, the number of columns in the table block being equal to the combined number of the null values and the non-null data in the at least one mapped data row; and process the at least one mapped data row to provide the regenerated data for storage at the receiving device.

9. The system of claim 8, wherein the memory comprises instructions which, when executed, further cause the receiving device to process the at least one mapped data row to provide the regenerated data for storage at the receiving device.

10. The system of claim 8, wherein the column definition includes predetermined metadata fields and extended metadata fields.

11. The system of claim 8, wherein the data result model further includes a final status block after the table block, and wherein the memory comprises instructions which, when executed, further cause the receiving device to:

determine based on the final status block whether the table block received by the receiving device is complete.

12. The system of claim 11, wherein the memory comprises instructions which, when executed, further cause the receiving device to read a user message in the final status block including a severity flag and a message in the final status block describing that the table block is complete.

13. A non-transitory computer-readable storage medium comprising instructions, which when executed on a processor, cause the processor to perform a method for transferring data, the method comprising:

sending, from a receiving device, a data query to request data from a sending device:

receiving, from the sending device, a data result model in response to the data query, the data result model including a table block;

analyzing the data result model to regenerate the data for storage at the receiving device, wherein the analyzing of the data result model comprises:

reading at least one column definition and at least one data row from the table block, the data row including a row flag, a null location list, and a row payload field including non-null data to be transferred to the receiving device:

determining the number of columns in the table block from the column definition;

analyzing the row flag to determine whether the data row includes null values and, when the row flag indicates a presence of the null values, further analyzing the null location list to determine location information for the non-null data and the null values; and creating at least one mapped data row by sequentially inserting the non-null data of the row payload field at non-null locations and inserting the null values at null locations determined from the null location list, the number of columns in the table block being equal to the combined number of the null values and the non-null data in the at least one mapped data row; and processing the at least one mapped data row to provide the regenerated data for storage at the receiving device.

14. The non-transitory computer-readable storage medium of claim 13, wherein the number of columns in the table block is expandable to any number.

15. The non-transitory computer-readable storage medium of claim 13, wherein the column definition includes predetermined metadata fields and extended metadata fields.

16. The non-transitory computer-readable storage medium of claim 13, wherein the data result model further includes a final status block after the table block, and wherein the method further comprises:

determining based on the final status block whether the table block received by the receiving device is complete.

17. The non-transitory computer-readable storage medium of claim 16, wherein determining whether the table block is complete further comprises reading a user message in the final status block including a severity flag and a message in the final status block describing that the table block is complete.

* * * * *